Oct. 16, 1923.
G. T. MALAN
1,471,274
COASTER BRAKE WITH BACK PEDALING DEVICE
Filed March 28, 1922
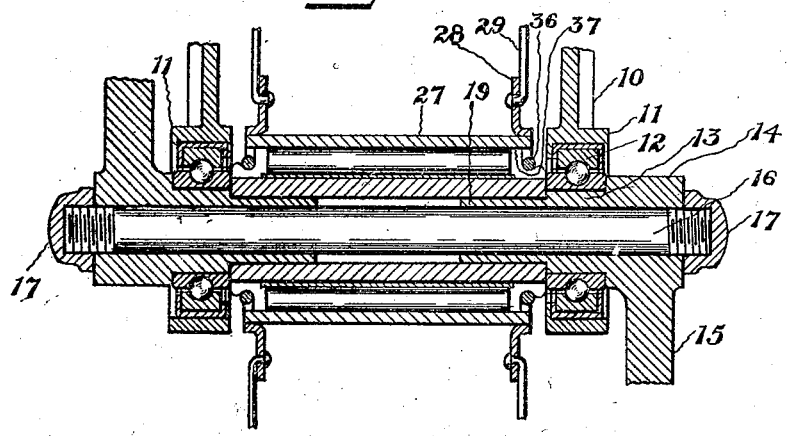
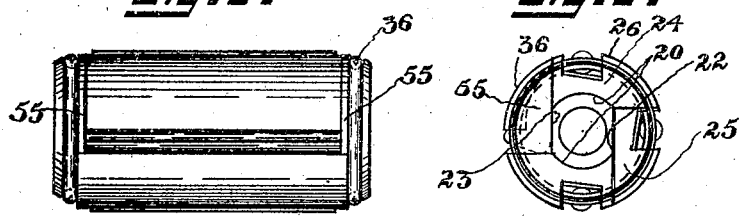
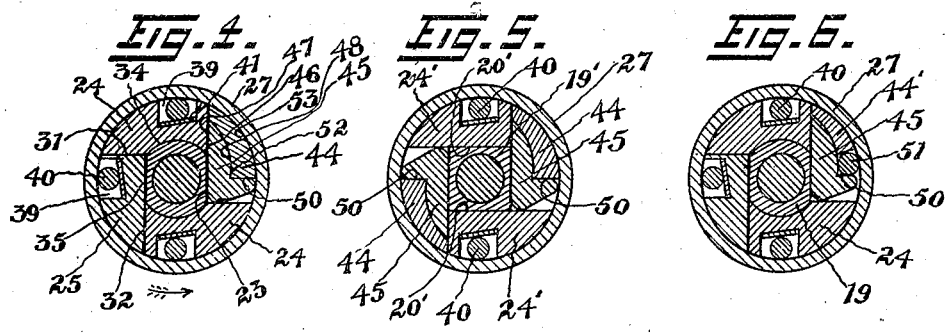
Witnesses:
Inventor:
Gordon T. Malan,
By his Atty, Patented Oct. 16, 1923.

1,471,274

UNITED STATES PATENT OFFICE.

GORDON T. MALAN, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

COASTER BRAKE WITH BACK-PEDALING DEVICE.

Application filed March 28, 1922. Serial No. 547,353.

*To all whom it may concern:*

Be it known that I, GORDON T. MALAN, a citizen of the United States, residing in Philadelphia, in the county of Philadelphia and State of Pennsylvania, have invented certain new and useful Improvements in Coaster Brakes with Back-Pedaling Devices, of which the following is a specification.

This invention relates to coaster brakes for velocipedes though it is noted that the invention is not limited to velocipedes nor even in some respects to vehicles or brakes.

The present invention relates particularly to a coaster brake alternative in form to the reverse pedaling ball clutch coaster brake shown in the U. S. application, Serial No. 537,293, filed Feb. 17, 1922, to August J. Mottlau, U. S., the latter relating to improvements in the coaster brake shown in Mottlau's U. S. Patent No. 1,398,883 issued Nov. 29, 1921.

In said patent there is shown, in combination with the bearings of the branches of the fork of the velocipede, cranks having tubular spindles journalled in said bearings and each formed with a squared portion receiving thereon a set of brake shoes mounted on polygonal portions of the spindles and outwardly actuated by said squared portions and provided with end grooves receiving annular slit springs tending to retain said shoes in engagement with the spindles. The wheel hub encloses the brake shoes, and clutch rollers disposed in longitudinal recesses of the brake shoes between the hub and the brake shoes operatively connect them when the cranks are turned in forward direction.

In said patent forward pedaling causes the rollers to engage and clutch the hub to drive the velocipede forward. Reverse pedaling unclutches the rollers and lets the pedals turn freely backwards. When the pedals are at the same time pressed, one forward and the other backward, the brake shoes engage the hub and put on the brake.

As above noted reverse pedaling causes the pedals of said patent to turn freely backward, thus preventing the rider from driving the velocipede backwards. It is this feature that the present invention has for its object to remove.

To this end my invention, briefly stated, is as follows:

Instead of four brake shoes as in said patent, three outwardly movable brake shoes are mounted on the alined spindles and enclosed by the cylindrical sleeve hub. In place of the missing shoe is disposed a clutch device interposed between adjacent shoes comprising an inner member resting against said spindles, and a wedge-shaped outer member adapted to be wedged between the inner member and the sleeve by backward rotation of the cranks and spindles of the vehicle, whereby the vehicle may be driven backwardly.

Other objects of the invention will appear as the description proceeds; and while herein details of the invention are described, the invention is not limited to these, since many and various changes may be made without departing from the scope of the invention as claimed.

In the accompanying drawing, showing by way of example several of many possible embodiments of the invention, Fig. 1 is a longitudinal vertical section showing my invention as applied to the driving wheel of a velocipede;

Figs. 2 and 3 are respectively front and end elevations of the interior mechanism of the brake;

Fig. 4 is a central transverse sectional view of the brake of Fig. 1; and

Figs. 5 and 6 are similar sectional views of modifications.

The improved coaster brake is shown in combination with the prongs or branches 10 of the fork of a velocipede, said branches having annular end portions 11 in which are mounted ball bearings 12 for the reception of the cylindrical portions 13 of the tubular spindles 14, which have their outer ends integral with the pedal cranks 15. Said tubular spindles are connected and held in place by a bolt 16 extending longitudinally through them and through the cranks 15, said bolt having on its opposite ends nuts 17, although obviously it may be otherwise constructed.

The inner or adjacent ends 19 of the crank spindles are provided diametrically opposite cylindrical portions 20 (Fig. 3), and diametrically opposite flattened portions 22 and 23. The cylindrical portions and the flattened portion 22 support segmental brake shoes 24 and 25, whose outer surfaces 26 are cylindrically curved to fit within and substantially fill the cylindrical hub sleeve 27 (Figs. 1 and 4) of the velocipede wheel, of which only said sleeve 27, the end flanges 28 and parts of the spokes 29 are here shown.

In the present instance the shoes 20 have tangentially disposed engaging faces 31 and 32 and also are respectively provided with round and flat faces 34 and 35 for engagement with the cylindrical and flat sides of the ends 19 of the crank spindles. At each end of the shoes a spring ring 36 (Fig. 1) is disposed in an annular groove 37 formed in the brake shoes whereby all of the shoes are yieldably held together and caused to return to positions with their faces 34 and 35 in engagement with the faces of the spindle ends 19 as shown in Fig. 4.

The shoes 24 and 25 are preferably formed with a longitudinally extending recess 39 in their cylindrically curved faces for the reception of clutch rollers 40, the bottom of each of these recesses, in the present instance, being provided with a wear plate 41 on which the roller rests, and are inclined at an acute angle to the adjacent inner surface of the hub sleeve, so that when the shoes are turned in the forward direction all of the rollers are caused to frictionally engage with the hub sleeve with a wedging action for rotating the wheel and driving the velocipede forwardly.

The shoes 24 and 25 as thus far described are very similar to those of said patent, except that those here shown are of a forwardly pointing wedge shape; and in the case of the form of Figs. 1 to 4 and 6 there are only three of the shoes. In the place of the fourth shoe, is disposed the back-pedaling clutch device forming the main subject matter of the present invention.

The back-pedaling clutch device is disposed against the flattened face 23 and comprises an outer member 44 and an inner member 45, the latter abutting against the rear adjacent shoe 24, and having a flat inner face 46 resting partly against said flattened face 23 and the adjacent face 47 of the next forward shoe and terminating intermediately of said adjacent face 47. The inner member 45 is provided with a curved outer face 48 meeting the forward end of said inner face 47, and also has an outwardly disposed rear flange forming a stop shoulder 50. The outer member 44 is a forwardly pointing approximately wedge shaped member rearwardly abutting said shoulder 50 and forwardly engaging flat against said adjacent face 47 of the next forward shoe and having a curved inner surface 52 engaging said curved face 48 of the inner member. Said outer member is provided with a curved outer face 53 adjacent to the inner face of said sleeve 27 and out of clutching engagement with the sleeve when the vehicle is coasting forwardly and driven into clutching engagement with said sleeve by the wedging of the outer member 44 between the inner member 45 and the sleeve 27 when the spindles 14 are rotated backwardly.

The sections 44 and 45 are not quite as long as the shoes 24 and 25 and when placed one on the other lie loose in the hub sleeve. These sections are prevented from falling out of the sleeve by the sleeve itself and by two small sections or plates 55 (Figs. 2 and 3), equivalent in shape to the cross section of the shoe 25 without the grooves 39. These plates are held at the ends of the sections 44 and 45 and are in turn kept in place by the rings 36.

The coaster brake as a whole, rests between the spindles 13 and the inner wall of the sleeve 27 as the drawing shows. This arrangement allows the sleeve to revolve on the cylinder formed by the shoes 24 and 25 and the sections 44 and 45.

In operation the crank spindles 14 are held from longitudinal movement on the bolt 16, but may be independently turned on said bolt to a limited extent. If the cranks 15 be turned forwardly, in a counter-clockwise direction, in Fig. 4, as indicated by the arrow, the shoes 24 and 25 on the ends 19 of the spindles 14 are turned with them and the rollers 40 engage with the sleeve 27 with a wedging action thereby to clutch said shoes to the hub sleeve 21. The sleeve 27 with the wheel attached thereto may thus be turned and the vehicle driven in a forward direction.

If the force applied to rotate the cranks 15 be removed, the shoes are held inward by the spring rings 36 and the wheel is free to turn forward independently of the cranks 15 and the shoes 24 and 25, and such forward movement, while the cranks do not rotate will cause the rollers 40 to move into inoperative positions at the deepest part of the recesses 39 and out of the contact with the sleeve, thereby permitting the vehicle to coast. If now one of the pedals be angularly rotated relatively to the other, as would occur if the pedals were pressed in opposite directions or if one of them was held and the other pressed backwardly, there is a relative angular displacement of the ends 19 which causes the flattened faces 22 and 23 to force outwardly the shoe 25 into frictional braking or retarding contact with the sleeve 21. At the same time the section 45 is pivoted and the section 44 slides over it because of friction with the sleeve 27. The forward rotation of the wheel, and forward motion of the vehicle are thus retarded, and this braking action may be stopped by again allowing the pedals and hence the shoe 25 to resume its normal position under the action of the rings 26.

The operation above described is generally similar to that shown in said patent.

Now will be described the operation of the back-pedaling clutch device whereby the vehicle may be driven backward.

When the vehicle has been brought to a stop and the pedals are revolved backwardly, the sliding friction of the section 44 with the sleeve tends to wedge this section tight between the sleeve and the section 45 and bind the sleeve to the brake. Thus the back-pedaling may be accomplished and the vehicle made to run backwards.

The coaster brake of Fig. 5 is very similar to that of Fig. 4 except that the inner end 19' of the spindle is squared, and the shoes 24' are identical in shape to the shoe 25 of Fig. 4 and rest flat against diametrically opposite flat sides 20', while in place of the shoe 25 of Fig. 4 the clutch device comprising the outer and inner sections 44 and 45 is substituted.

The operation of the brake of Fig. 5 is similar to that of Fig. 4 except that in the brake of Fig. 5, the shoes 24' are pressed against the sleeve 27 when the ends 19' are relatively rotated. The function and operation of the sections 44 and 45 is the same as in Fig. 4.

The coaster brake of Fig. 6 is similar to that of Fig. 4 except that a clutch roller 51 shorter than the section 45 is disposed against the shoulder 50 of the inner section 45 and the outer section 44' is narrower than the section 44 and rearwardly abuts said roller 51.

The braking and coasting action is the same as for the brake of Fig. 6; and the backward running is practically the same except that the rolling of the roller 51 caused by friction at the beginning of the back-pedaling operation helps drive the section 44 into wedging action.

I claim:

1. In combination, a rotatable drive means; a driven member rotatable relative to the drive means when the drive means is at rest; means whereby the driven member is turned forwardly; and an additional means movable radially outwardly, whereby, when the drive means is rotated backwardly, the driven member is thereby rotated backwardly.

2. In combination, a drive means; brake shoes rotatable on said means; a sleeve enclosing said shoes; and a clutch device disposed between adjacent shoes.

3. In combination, a drive means; outwardly movable shoes mounted on said means; a sleeve enclosing said shoes; and a clutch device disposed between adjacent shoes and between said means and the sleeve.

4. In combination, a drive means; outwardly movable shoes mounted on said means; a cylindrical sleeve enclosing said shoes; and a clutch device operable by wedging action disposed between adjacent shoes and between said means and the sleeve.

5. In combination, a drive means; outwardly movable brake shoes mounted on and rotatable by said means; a cylindrical sleeve enclosing said shoes; and a clutch device operable by wedging action disposed between adjacent shoes and between said means and the sleeve, and comprising an outer section movable outwardly toward said sleeve.

6. In combination, a drive means; three outwardly movable brake shoes mounted on said means; a cylindrical sleeve enclosing said shoes; and a clutch device disposed between said adjacent shoes and against said means and comprising an inner member resting against said means; and a forwardly pointing wedge shaped outer member adapted to be wedged between the inner member and the sleeve by backward rotation of said means.

7. In combination, a pair of alined spindles having diametrically opposite flattened side portions and intermediate portions; relatively movable brake shoes respectively mounted on said intermediate portions and one of the flattened portions; a sleeve enclosing said shoes; clutch means disposed between said shoes and sleeve and operative on forward movement; an inner member resting against the other flattened portion; and a forwardly pointing wedge-shaped outer member disposed between the inner member and the sleeve and adapted to be wedged therebetween by backward rotation of the spindles.

8. In combination, a pair of alined spindles diametrically opposite flattened side portions and intermediate portions; relatively movable brake shoes respectively mounted on said intermediate portions and one of the flattened portions and each being of forwardly pointing wedge-shaped section; a cylindrical sleeve enclosing said shoes; clutch means disposed between said shoes and sleeve and operative when the shoes are turned forward; a forwardly pointing wedge-shaped inner member abutting against the rear adjacent shoes and resting partly against the other flattened portion and the next forward shoes; and a forwardly pointing wedge-shaped outer member engaging the next forward shoe and said inner member, and disposed adjacent to said sleeve and adapted to be wedged between the inner member and the sleeve by backward rotation of the spindles.

9. In combination, a pair of alined spindles each having diametrically opposite cylindrical portions and flattened portions; relatively movable brake shoes respectively mounted against said cylindrical portions and one of the flattened portions, and each of forwardly pointing wedge-shape and having curved outer face co-axial with the spindles; a cylindrical sleeve enclosing said shoes; clutch means disposed between said shoes and sleeve operative when the shoes are turned forwardly; a clutch device disposed against the other flattened face and comprising a forwardly pointed wedge-shaped inner member abutting against the rear adjacent shoe and having a curved outer face, a flat inner face resting partly against said flattened face and the adjacent face of the next forward shoe and terminating intermediately of said adjacent face, and an outwardly disposed rear flange forming a stop shoulder; a forwardly pointing wedge-shaped outer member rearwardly abutting said shoulder and forwardly engaging flat against said adjacent face and having a curved inner surface engaging said curved face, and a curved outer face adjacent to said sleeve.

10. In combination, a drive means; yieldably outwardly movable brake shoes mounted on said means; a sleeve enclosing said shoes; a clutch device disposed between adjacent shoes and between the drive means and the sleeve; and retaining means disposed against the ends of said device.

11. In combination, a drive means; a plurality of outwardly movable brake shoes mounted on said means; spring means for holding said shoes on the drive means; a sleeve enclosing said shoes; an inner member disposed between adjacent shoes and resting against said drive means; a wedge member disposed between the inner member and the sleeve; and end plates disposed between the ends of said members and the spring means.

12. In combination, a drive means; three outwardly movable brake shoes mounted on said means and provided with outwardly opening grooves in the ends; spring rings in said grooves; a cylindrical sleeve enclosing said shoes; an inner member disposed between said adjacent shoes and resting against said means; a forwardly pointing wedge-shaped outer clutch member disposed between and adapted to be wedged between the inner member and the sleeve; and end plates disposed between the ends of said members and the rings.

13. In combination, alined spindles having squared ends; two outwardly movable brake shoes mounted against opposite sides of said ends; a cylindrical sleeve enclosing said shoes; and a pair of clutch devices disposed between said shoes and against the other sides of said ends and comprising an inner member resting against said means, and a forwardly pointing wedge-shaped outer member adapted to be wedged between the inner member and the sleeve by backward rotation of said means.

14. In combination, a pair of alined spindles diametrically opposite flattened side portions and intermediate rounded portions; relatively movable brake shoes respectively mounted on said intermediate portions and one of the flattened portions and each being of forwardly pointing wedge-shaped section; a cylindrical sleeve enclosing said shoes; clutch means disposed between said shoes and sleeve and operative when the shoes are turned forward; a clutch device disposed against the other flattened face and comprising an inner member abutting against the rear adjacent shoe and having a flat inner face resting partly against said flattened face and the adjacent face of the next forward shoe and terminating intermediately of said adjacent face; said inner member having a curved outer face meeting the forward end of said inner face, and an outwardly disposed rear flange forming a stop shoulder; a clutch roller disposed against said shoulder; a forwardly pointing wedge-shaped outer member rearwardly abutting said roller and forwardly engaging flat against said adjacent face of the next forward shoe and having a curved inner surface engaging said curved face of the inner member, and a curved outer face adjacent to the inner face of said sleeve.

15. In combination, a pair of alined spindles diametrically opposite flattened side portions and intermediate portions; relatively movable brake shoes respectively mounted on said intermediate portions and one of the flattened portions and each being of forwardly pointing wedge-shaped section; and a cylindrical sleeve enclosing said shoes.

16. In combination, a pair of alined spindles each having diametrically opposite cylindrical portions and flattened portions; relatively movable brake shoes respectively mounted against said cylindrical portions and one of the flattened portions, and each of forwardly pointing wedge-shape and having a curved outer face co-axial with the spindles; a cylindrical sleeve enclosing said shoes; and clutch rollers disposed between said shoes and sleeve operative when the shoes are turned forwardly.

GORDON T. MALAN.

Witnesses:
ALBERT E. PARKER,
WILLIAM H. WICHMAN.